(12) United States Patent
Blaha et al.

(10) Patent No.: US 7,643,315 B2
(45) Date of Patent: Jan. 5, 2010

(54) PROGRAMMABLE FEEDBACK VOLTAGE PULSE SAMPLING FOR SWITCHED POWER SUPPLIES

(75) Inventors: Matthew Blaha, Holmdel, NJ (US); Albert Molina, Alcobendad (ES); Patrick J. Quirk, Huntsville, AL (US); Fadi Saibi, Hoboken, NJ (US)

(73) Assignee: Agere Systems, Inc., Allentown, PA (US)

( * ) Notice: Subject to any disclaimer, the term of this patent is extended or adjusted under 35 U.S.C. 154(b) by 0 days.

(21) Appl. No.: 12/313,344

(22) Filed: Nov. 19, 2008

(65) Prior Publication Data
US 2009/0073734 A1 Mar. 19, 2009

Related U.S. Application Data

(63) Continuation of application No. 11/507,798, filed on Aug. 22, 2006, now Pat. No. 7,471,531.

(51) Int. Cl.
*H02M 3/335* (2006.01)
(52) U.S. Cl. .................. 363/21.13; 363/21.16; 363/97
(58) Field of Classification Search ............ 363/21.13, 363/21.16, 97
See application file for complete search history.

(56) References Cited

U.S. PATENT DOCUMENTS

| | | | |
|---|---|---|---|
| 4,004,104 A | 1/1977 | Picandet et al. ............ 179/70 |
| 4,761,702 A | 8/1988 | Pinard ........................ 361/18 |
| 5,138,543 A | 8/1992 | Harm et al. .............. 363/21.08 |
| 5,305,192 A | 4/1994 | Bonte et al. .............. 363/21.16 |
| 5,402,329 A | 3/1995 | Wittenbreder ................ 363/16 |
| 5,461,303 A | 10/1995 | Leman et al. ............... 323/222 |
| 5,757,625 A | 5/1998 | Schoofs .................... 363/21.13 |
| 5,991,172 A | 11/1999 | Jovanovic et al. ........ 363/21.14 |
| 6,343,026 B1 | 1/2002 | Perry .......................... 363/65 |
| 6,640,308 B1 | 10/2003 | Keyghobad et al. ......... 713/300 |
| 6,650,070 B1 | 11/2003 | Hudson et al. .............. 315/312 |
| 6,958,920 B2 | 10/2005 | Mednik et al. ................ 363/19 |
| 6,967,472 B2 | 11/2005 | Balakrishnan et al. ...... 323/284 |
| 6,972,969 B1 | 12/2005 | Shteynberg et al. ...... 363/21.12 |

(Continued)

FOREIGN PATENT DOCUMENTS

DE    103 32 841 A1    2/2005

(Continued)

OTHER PUBLICATIONS

"High Power Isolated Flyback Controller", Linear Technology. pp. 1-28. Downloaded from: http://www.linear.com/pc/productDetail.do?navId=HO,C1,C1003,C1042,C1113,P1920, Apr. 5, 2006.

(Continued)

*Primary Examiner*—Jeffrey L Sterrett
(74) *Attorney, Agent, or Firm*—Mendelsohn, Drucker & Associates, P.C.; Edward J. Meisarosh; Steve Mendelsohn

(57) ABSTRACT

Disclosed is a method and apparatus that includes a power supply having a primary coil and a secondary coil. The secondary coil generates an output voltage and a feedback voltage related to the output voltage. The feedback voltage is sampled at a time instant that is digitally controllable. The output voltage is determined from the feedback voltage.

14 Claims, 4 Drawing Sheets

U.S. PATENT DOCUMENTS

| | | | |
|---|---|---|---|
| 6,995,991 B1 | 2/2006 | Yang et al. | 363/21.03 |
| 7,054,170 B2 | 5/2006 | Yang et al. | 363/21.18 |
| 7,057,907 B2 | 6/2006 | Oh | 363/21.05 |
| 7,061,780 B2 | 6/2006 | Yang et al. | 363/21.16 |
| 7,142,437 B2 | 11/2006 | Park | 363/18 |
| 7,196,503 B2 | 3/2007 | Wood et al. | 323/276 |
| 7,259,972 B2 * | 8/2007 | Yang | 363/21.16 |
| 7,280,376 B2 | 10/2007 | McDonald et al. | 363/20 |
| 7,362,593 B2 * | 4/2008 | Yang et al. | 363/21.16 |
| 7,471,522 B2 | 12/2008 | Ng et al. | 363/21.12 |
| 7,471,531 B2 * | 12/2008 | Blaha et al. | 363/97 |
| 7,486,528 B2 | 2/2009 | Yang | 363/21.12 |
| 2003/0080723 A1 | 5/2003 | Chen et al. | 324/76.29 |
| 2005/0169017 A1 | 8/2005 | Muegge et al. | 363/21.15 |
| 2005/0285587 A1 | 12/2005 | Yang et al. | 324/103 P |
| 2006/0002155 A1 | 1/2006 | Shteynberg et al. | 363/21.12 |
| 2006/0034102 A1 | 2/2006 | Yang et al. | 363/21.13 |
| 2006/0056204 A1 | 3/2006 | Yang et al. | 363/10 |
| 2007/0019445 A1 | 1/2007 | Blaha et al. | 363/21.12 |
| 2007/0024213 A1 | 2/2007 | Shteynberg et al. | 315/291 |
| 2007/0070664 A1 | 3/2007 | Chen | 363/95 |
| 2008/0049459 A1 | 2/2008 | Blaha et al. | 363/21.16 |
| 2008/0071260 A1 | 3/2008 | Shores | 606/34 |
| 2008/0192514 A1 | 8/2008 | Zhou et al. | 363/21.12 |
| 2008/0238447 A1 | 10/2008 | de la Torre Vega et al. | 324/676 |

FOREIGN PATENT DOCUMENTS

| | | |
|---|---|---|
| JP | 2001203085 | 7/2001 |

OTHER PUBLICATIONS

L. Balogh, "A Practical Introduction to Digital Power Supply Control", Texas Instruments Incorporated, 2005, pp. 6-1 through 6-29. Downloaded from http://focus.ti.com/lit/ml/slup232.pdf, Apr. 5, 2006.

L. Dixon, "Control Loop Cookbook", Texas Instruments Incorporated, 2002, 41 pages. Downloaded from: http://focus.ti.com/lit/ml/slup113a/slup113a.pdf, Apr. 5, 2006.

K. Kittipeerachon, et al., "Feedback Compensation Design for Switched Mode Power Supplies with a Right-Half-Plane (RHP) Zero", Power Electronics, Machines and Drives, 2004, (PEMD 2004). Second International Conference on (Conf. Publ. No. 498), pp. 236-241.

Y-F. Liu, et al., "Digital Control of Switching Power Converters", Proc. of IEEE Conference on Control Applications, Toronto, Canada, Aug. 28-31, 2005, pp. 635-640.

A. Peterchev, et al., "Quantization Resolution and Limit Cycling in Digitally Controlled PWM Converters", IEEE Trans. on Power Electronics, vol. 18, No. 1, Jan. 2003, pp. 301-308.

"Introduction to Power Supplies", National Semiconductor Application Note 556, Sep. 2002, pp. 1-7. Downloaded from: http://www.efficientpowersupplies.org/pages/intro_to_power_supplies.pdf, Apr. 5, 2006.

* cited by examiner

PROGRAMMABLE FEEDBACK VOLTAGE PULSE SAMPLING FOR SWITCHED POWER SUPPLIES

CROSS REFERENCE TO RELATED APPLICATION

This application is a continuation of U.S. patent application Ser. No. 11/507,798, filed Aug. 22, 2006, now U.S. Pat. No. 7,471,531 which is incorporated herein by reference in its entirety.

BACKGROUND OF THE INVENTION

The present invention relates generally to power supplies and more specifically to isolated switching power supplies.

Efficient and ever smaller size power supplies are in high demand in almost all electronics devices in a wide range of applications. For example, smaller and more efficient power supplies are needed in telecommunication and embedded system applications, Power-over-Ethernet (POE) applications, microprocessors and chipsets requiring precise and robust voltage regulation, personal computers, cellular telephones, personal digital assistants (PDAs), etc.

Power supply architectures can be classified according to the structure of their power stage and associated properties. One such power supply is a flyback power supply. FIG. 1 shows a flyback power stage circuit 100 having a transformer consisting of three coils 104, 108, and 112. Coil 112 is the primary coil, coil 104 is the feedback coil, and coil 108 is the secondary coil. The secondary coil 108 is connected to a diode 116 and a capacitor 120 to rectify and smooth the output voltage signal. The output voltage $V_{out}$ is the voltage between the two endpoints of the capacitor 120. The input voltage $V_{in}$ 122 is the fixed potential of one end of the primary coil 112 relative to the system ground. The feedback voltage 132 is the voltage of the node 134 relative to the system ground. It is typically proportionally related to the voltage across the feedback coil 104 through a resistive voltage divider.

A metal oxide semiconductor field effect transistor (MOSFET) 124 is typically connected to one endpoint of the primary coil 112. The MOSFET 124 switches on and off, thereby transferring electromagnetic energy from the primary coil 112 to the secondary coil 108. The switching MOSFET control waveform duty cycle sets the output voltage level. It also induces changes in the voltage between the two endpoints of the feedback coil 104 (and, thus, in the feedback voltage 132). When the MOSFET 124 switches on and off, the feedback voltage 132 changes. Therefore, the feedback voltage 132 is a pulsed waveform.

The output voltage $V_{out}$ can be measured indirectly via the feedback coil 104. Thus, the output voltage $V_{out}$ can be measured indirectly from the feedback voltage 132. At specific time intervals the feedback voltage 132 is proportional to the output voltage $V_{out}$. The feedback voltage 132 is compared to a reference voltage level to compute an error signal used to modify the MOSFET switch control waveform and close a control loop that regulates the output voltage $V_{out}$ at a wanted level.

The flyback circuit 100 uses analog components to indirectly measure the output voltage $V_{out}$. The analog components measure the feedback voltage 132 during a specific time period. In particular, when the MOSFET 124 is turned "on", the primary coil 112 obtains a fixed, non-zero voltage. When the MOSFET 124 is then turned "off", the feedback coil 104 obtains a voltage (through induction) and a feedback pulse appears. Thus, the feedback voltage is measured during the time intervals that the MOSFET 124 is switched "off". However, due to leakage inductance effects primarily which cause an initial voltage spike, it takes a finite time until the feedback voltage 132 accurately represents the output voltage $V_{out}$. In order to extract the relevant output voltage information from the feedback voltage 132, a fixed delay is introduced between the MOSFET 124 switch-off command and the enabling of feedback-voltage-measuring circuitry. This fixed delay is set by a choice of resistors and capacitors.

Because resistors and capacitors are analog components, there are traditionally imperfections associated with each of them. These imperfections can result in imprecision with respect to their listed value. Thus, a resistor may have an actual value that is slightly different than its listed value. These imperfections will likely have an effect on the resulting time. Further, the values of resistors and/or capacitors may fluctuate with temperature changes. As a result, many attempts may be needed to determine which resistors and which capacitors to use in order to accurately measure the feedback voltage. Additionally once component values have been chosen to implement a certain fixed delay, these components would have to be replaced to implement another fixed delay. This can be required if the power supply is used under different load conditions.

Therefore, there remains a need to more accurately determine output voltage information from the feedback voltage of a flyback circuit.

BRIEF SUMMARY OF THE INVENTION

In accordance with an aspect of the present invention, a flyback power supply has a primary coil and a secondary coil. A rectification stage connected to the secondary coil generates an output voltage. A feedback voltage is also generated, which is related to the output voltage. The feedback voltage is sampled at a time instant relative to the MOSFET switch-off command instant that is digitally controllable. The output voltage is determined from the feedback voltage. In one embodiment, the flyback power supply also has a feedback coil to facilitate the measuring of the feedback voltage. Alternatively, the feedback voltage can be measured by a transistor, diode, and resistor configuration.

In one embodiment, the time delay between the MOSFET switch-off instant and the feedback voltage sampling instant is set by programming a register. This programming sets a fixed propagation delay for the digital control signal of a switch (e.g., a metal oxide semiconductor field effect transistor), that also induces the appearance of a feedback voltage pulse, back to a feedback voltage sampling circuit. In one embodiment, the programming of the register determines a number of flip flops to use to delay the sampling of the feedback voltage relative to the switch-off command instant. The induced feedback voltage typically experiences a spike right after the switch-off command instant before leveling off into a plateau. The sampling of the feedback voltage occurs at the start of the plateau.

In another embodiment, the present invention includes a power supply having a primary coil, a feedback coil, and a secondary coil. The secondary coil generates an output voltage and the feedback coil generates a feedback voltage related to the output voltage. A digital loop control samples the feedback voltage at a first time instant and a digital delay chain delays the first time instant by a programmable number of clock cycles. A software register is used to program the delay.

In one embodiment, a control and software interface module provides a hardware interface between the software layers and the digital delay chain through control and status registers and hardware connections. The control and software interface module can also include an interface between registers and a control state machine.

An embodiment of the present invention can also include a sample and hold circuit for receiving the feedback voltage. The sample and hold circuit is connected to an analog to digital converter for converting the feedback voltage into a digital signal (e.g., digital word).

These and other advantages of the invention will be apparent to those of ordinary skill in the art by reference to the following detailed description and the accompanying drawings.

DETAILED DESCRIPTION

Figure 1:
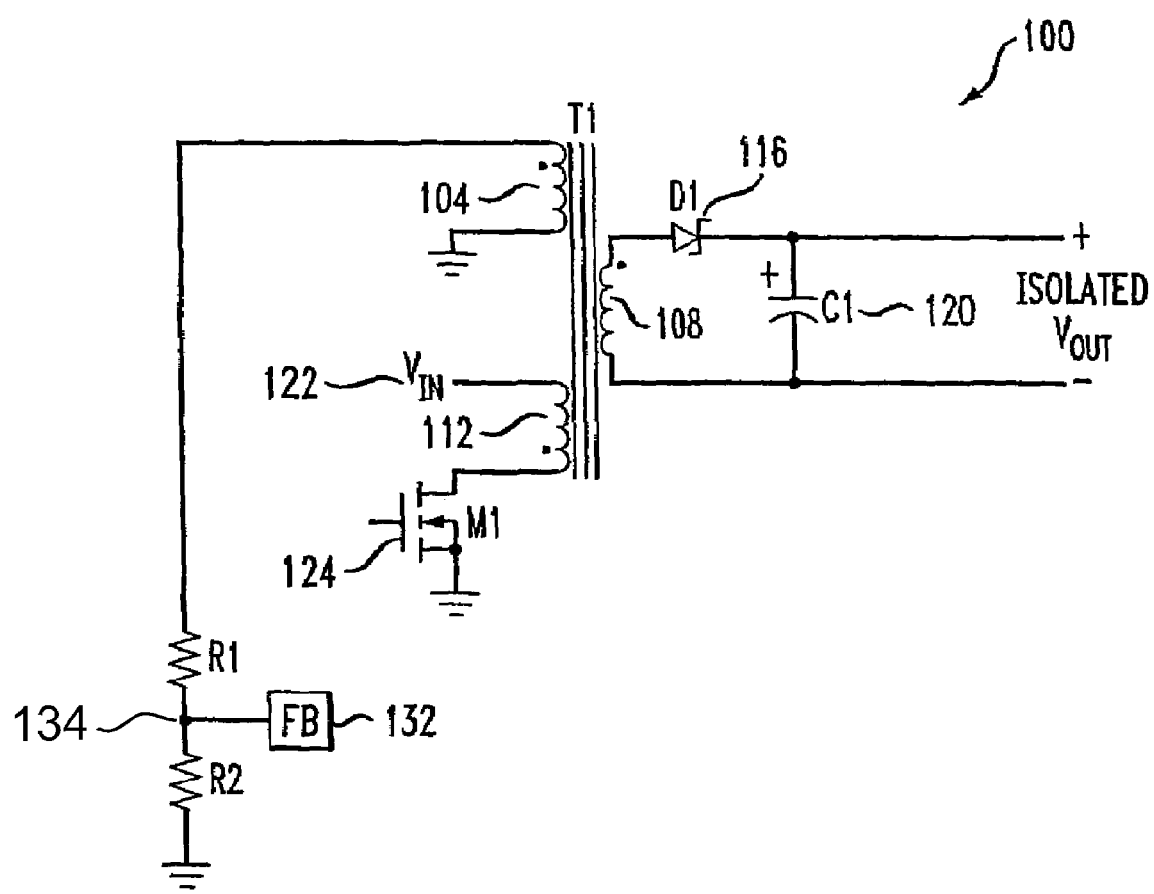
FIG. 1 is a block diagram of a flyback power stage circuit having three coils and producing an output voltage and a feedback voltage.
Figure 2:
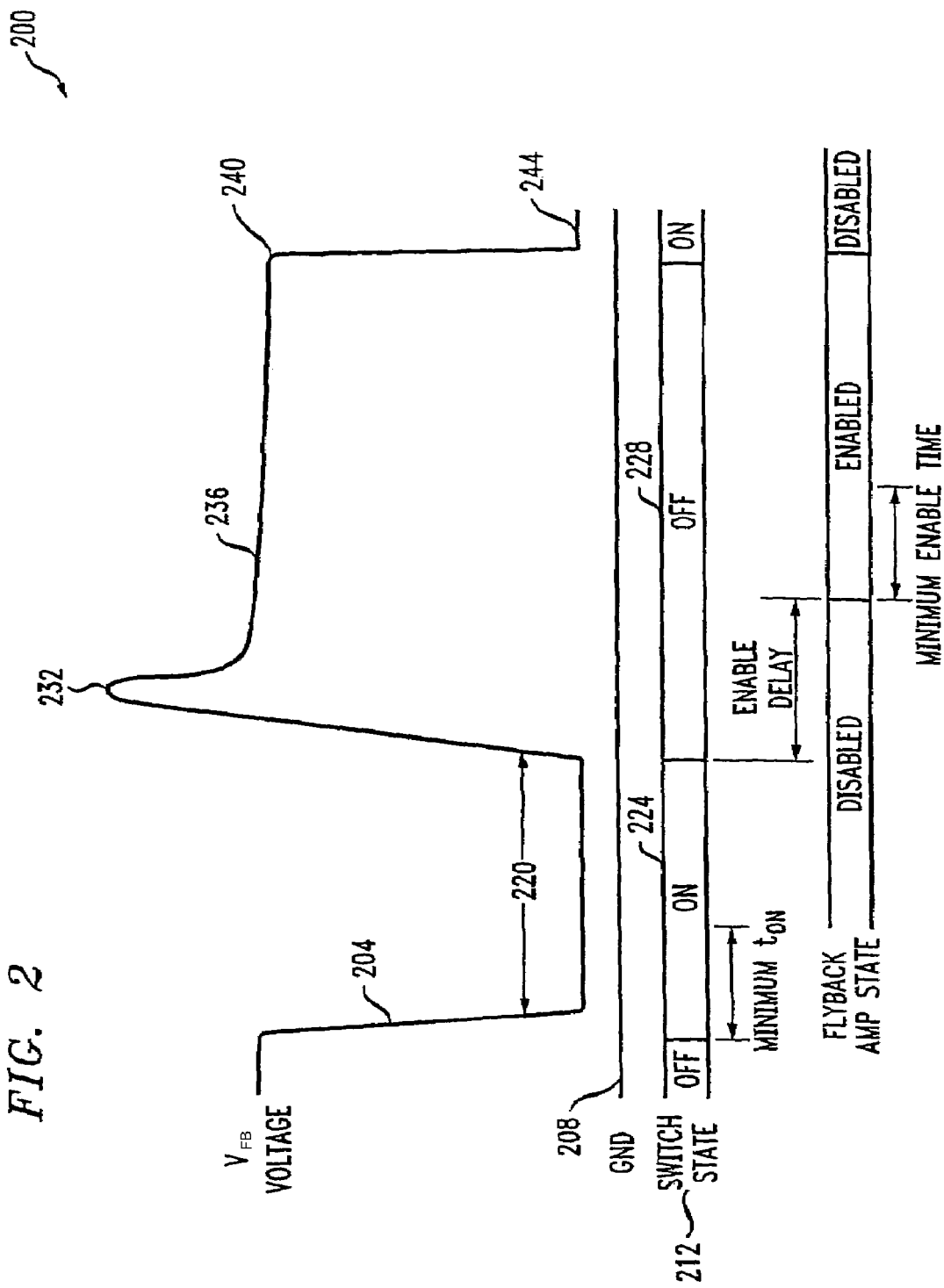
FIG. 2 is a timing diagram of a feedback voltage waveform associated with the feedback voltage.

FIG. 2 is a timing diagram 200 for the feedback voltage 132 of the flyback circuit 100. The timing diagram 200 includes a waveform 204 representing the feedback voltage 132. The waveform 204 is plotted with respect to a ground line 208 (i.e., zero volts). The timing diagram 200 also includes a switch state 212 illustrating the state of the MOSFET switch 124. Although described above and below with a MOSFET switch, any switching element may be used (e.g., transistor(s), logic gates, relays, switch, etc.). The waveform 204 is below an input voltage Vin line 216 during a first period 220. A first period 220 occurs while the MOSFET switch 124 is in an "on" state, as shown with the "ON" block 224 of the switch state 212. When the MOSFET switch 124 is turned "off" (shown with the "OFF" block 228 of the switch state 212), the feedback voltage 132 initially spikes upward, as shown with spike 232. The feedback voltage 132 then levels off at a plateau 236 until it collapses by itself or the MOSFET 124 is switched back "on". Once this occurs, the feedback voltage waveform 204 (and, therefore, the feedback voltage 132) falls at point 240 and levels off close to the ground 208 at line 244.

The time that the feedback voltage waveform 204 accurately represents the output voltage $V_{out}$ is during the plateau 236. Thus, if a circuit designer uses analog components such as resistors and capacitors to set a time constant to measure this feedback voltage 132 (and, therefore, to indirectly measure the output voltage $V_{out}$), the values of the resistors and capacitor have to be extremely accurate because the time period of the plateau is typically extremely small (e.g., in the few hundreds of nanoseconds). Because of natural imperfections in analog components such as resistors and capacitors, it is often difficult to set their values correctly. Often, a lab technician has to choose resistor and capacitor values through trial and error. Further, resistor and/or capacitor values may be affected by changes in temperature.

Figure 3:
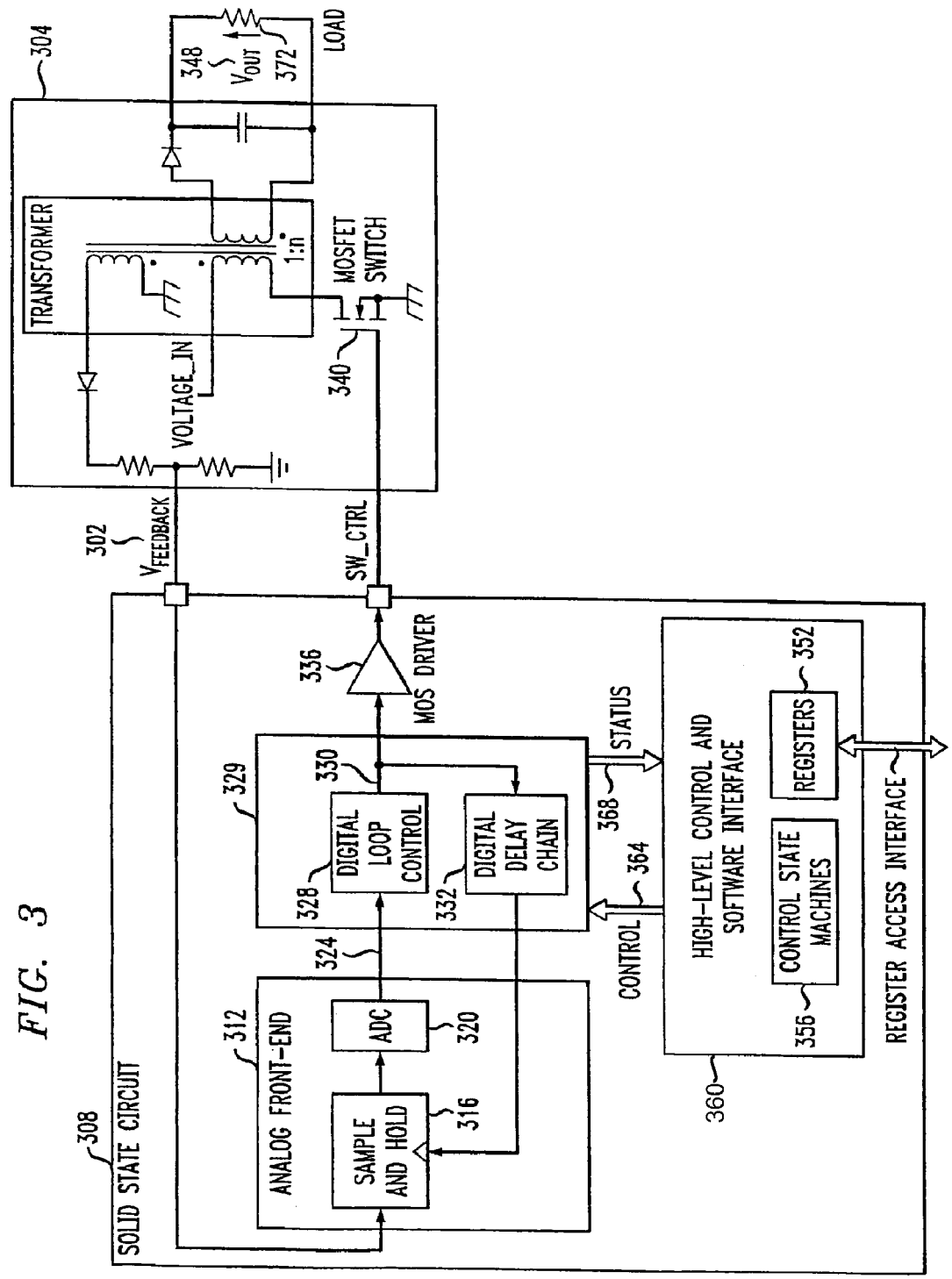
FIG. 3 is a block diagram of a switching voltage regulation circuit that digitally samples the feedback voltage of a flyback power stage.

FIG. 3 shows a block diagram of a circuit that digitally samples feedback voltage $V_{feedback}$ 302 of a flyback power supply 304. In particular, the digital sampling, or measuring, of feedback voltage $V_{feedback}$ 302 is performed by solid state circuit 308. The feedback voltage $V_{feedback}$ 302 is transmitted to an analog front-end circuit 312. The analog front-end circuit 312 includes a sample and hold circuit 316. The sample and hold circuit 316 is used to interface the analog feedback voltage $V_{feedback}$ 302 to an analog-to-digital converter (ADC) 320. The sample and hold circuit 316 holds the relevant analog value of the feedback voltage $V_{feedback}$ 302 steady until the next sampling instant. During that time, the ADC 320 performs operations to convert the sampled value into a digital word to be used for further digital processing.

The ADC 320 converts the analog feedback voltage $V_{feedback}$ 302 into a digital word 324 and transmits the digital word 324 to a digital loop control 328 in circuit 329. The output 330 of the digital loop control 328 is a switching control waveform primarily controlling the state of the MOSFET switch 340 (ON or OFF) through a MOSFET driver 336. It is also transmitted through a digital delay chain 332 back to the sample and hold circuit 316. The digital delay chain 332 includes one or more flip flops (e.g., D flip flops) clocked at a digital system clock to cause a known delay that is a multiple of the digital system clock period. For example, if the digital delay chain 332 uses one flip flop, the delay is one clock cycle. Similarly, if the digital delay chain 332 uses two flip flops, the delay is two clock cycles.

Thus, the output signal 330 of the digital loop control 328 is used for two purposes. First, the output signal 330 is used to determine the state of the MOSFET switch 340. As a result, the output signal 330 controls when the MOSFET switch 340 is turned "on" and when the switch 340 is turned "off". This also sets the boundaries, especially the start, of the feedback pulse in the $V_{feedback}$ waveform.

Second, the output signal 330 is used to determine when to trigger the sample and hold circuit 316 based on the digital delay chain 332. The digital delay chain 332 introduces a delay relative to the time when the MOSFET switch 340 is switched "off". Since the same control waveform determines the MOSFET state inducing the appearance of the feedback pulse and the sampling instant after being precisely delayed, this relative sampling instant is controllable and can be precisely adjusted. This delay sets the sampling instant relative to the instant when the MOSFET is switched off, which is also the start of the feedback pulse in the $V_{feedback}$ waveform. The digitally controlled delay of the digital delay chain 332 enables the circuit 308 to sample the feedback voltage waveform 204 (and, therefore, the feedback voltage $V_{feedback}$ 302) at the time at which it accurately represents output voltage Vout 348 (i.e., at the plateau 236).

The circuit 308 also includes a high level control and software interface 360. The high level control and software interface 360 includes registers 352 (and their access interface) and control state machines 356. The registers 352 are software registers that can be programmed to enable the changing of when the feedback voltage $V_{feedback}$ 302 is measured while the MOSFET switch is "off". The data stored in the registers 352 are transmitted to circuit 329, as shown with control arrow 364.

The control state machines 356 are state machines that transition from one state to another based on the status 368 received from circuit 329. For example, it can consist of a state machine with four states: IDLE, DISABLED, LOOP_ENABLED and VOLTAGE_STEADY. The state machine starts in IDLE state when reset and moves to the DISABLED state. A wanted voltage control word can be programmed and passed to the digital loop control circuit. The state subsequently moves to LOOP_ENABLED and the digital loop control operation is enabled through the control interface 364. The loop operation will compare the sampled feedback voltage word to the voltage control word and use the error word to modify the output signal 330 duty cycle so that the error is reduced and thus move the output voltage closer to the wanted voltage. When the error word magnitude goes below a small threshold, the digital loop control indicates through the status interface 368 that a steady state has been reached. The state machine consequently moves to a VOLTAGE_STEADY state which can be reported to software layers. Based on high-level operations the state machine state can be directed to DISABLED again for regulation under new conditions or to IDLE if it is reset.

As the circuit 308 is digital and can be programmed via the registers 352, the circuit 308 accurately samples the feedback voltage $V_{feedback}$ 302 and also provides flexibility due to software-controlled adjustments.

Moreover, change in the sampling point can occur dynamically to allow continued operation over a wide range of load conditions. For example, if the resistance of the load 372 varies, this can change the shape of the feedback voltage $V_{feedback}$ pulse waveform 302. In one embodiment, software controls the registers 352 so that the change in feedback voltage $V_{feedback}$ 302 causes an adjustment in the registers 352. The change in feedback voltage $V_{feedback}$ 302 causes a status signal (shown with arrow 368) to be sent to the control and software interface 360. Software then uses this status signal to adjust the sampling point of circuit 329. Once the feedback voltage $V_{feedback}$ 302 is correctly measured, the output voltage $V_{out}$ 348 can be accurately determined.

Figure 4:
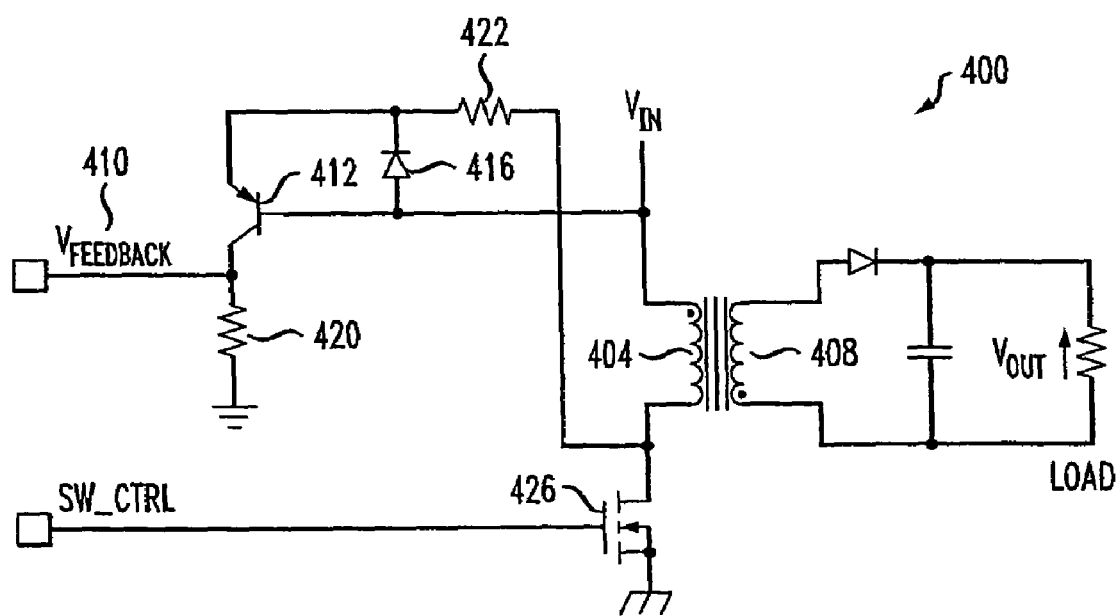
FIG. 4 is a block diagram of an isolated flyback power supply.

Although described above with three coils, the isolated flyback power supply can alternatively have two coils. FIG. 4 shows an isolated flyback power supply 400 that is connected to solid state circuit 308 of FIG. 3. The power supply 400 has a primary coil 404 and a secondary coil 408 but does not have a feedback coil. The feedback voltage $V_{feedback}$ 410 is instead measured by using the transistor 412, diode 416, and resistors 420, 422. Specifically, the voltage at the drain of the MOSFET 426 minus the voltage between the base and emitter of the transistor 412 is converted to a current by the resistor 422 and then back to a voltage at the resistor 420. Stated mathematically:

$$V_{feedback} 426 = (V_{drain\ MOSFET} - V_{BE})(\text{Resistor } 420/\text{Resistor } 422)$$

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A circuit-implemented method for determining an output voltage of an isolated flyback power supply having a primary coil and a secondary coil, said secondary coil for generating said output voltage and for inductively generating a feedback voltage related to said output voltage, said method comprising:

determining a digitally controllable time instant using a time delay based on a value stored in a register;

sampling said feedback voltage at the digitally controllable time instant; and determining said output voltage from said sampled feedback voltage.

2. The method of claim 1 wherein said time instant is specified by a register.

3. The method of claim 1 comprising digitally controlling a switch that controls said feedback voltage.

4. The method of claim 1 wherein said feedback voltage spikes before leveling off into a plateau.

5. The method of claim 4 wherein said sampling said feedback voltage occurs at the start of said plateau.

6. A circuit-implemented method for an isolated flyback power supply having (a) on a primary side, (i) a primary coil, (ii) a controller having a clock signal having a period, and (iii) a switch connected to the primary coil and controlled by the controller and (b) on a secondary side, a secondary coil, the method comprising:

setting a delay parameter D corresponding to an integer multiple of the period of the clock signal;

configuring, based on the delay parameter, the controller to sample, on the primary side, a feedback voltage, proportional to a voltage across the secondary coil, D periods of the clock signal after a turn-off time;

at a turn-on time before the turn-off time, turning on the switch;

at the turn-off time, turning off the switch to generate the feedback voltage; and sampling the feedback voltage D periods of the clock signal following the turn-off time.

7. The method of claim 6, wherein the configuring step comprises configuring a digital delay chain to delay the sampling by D periods of the clock signal.

8. The method of claim 6, wherein the sampling step comprises analog-to-digital conversion.

9. The method of claim 8, wherein the analog-to-digital conversion comprises converting a value of the feedback voltage into a digital word for further digital processing.

10. The method of claim 6, wherein the controller is configured to sample the feedback voltage exactly once between the turn-off time and a subsequent turn-on time.

11. The method of claim 6, wherein the configuring step is performed by a high-level control and software interface.

12. The method of claim 11, wherein the high-level control and software interface comprises a set of registers, wherein the delay parameter is stored in the set of registers.

13. The method of claim 6, further comprising dynamically changing the delay parameter D.

14. The method of claim 6, wherein:

the configuring step comprises configuring a digital delay chain to delay the sampling by D periods of the clock signal;

the sampling step comprises analog-to-digital conversion;

the analog-to-digital conversion comprises converting a value of the feedback voltage into a digital word for further digital processing;

the controller is configured to sample the feedback voltage exactly once between the turn-off time and a subsequent turn-on time;

the configuring step is performed by a high-level control and software (HLCS) interface; and the HLCS interface comprises a set of registers, wherein the delay parameter is stored in the set of registers.

* * * * *